United States Patent
Oprea et al.

(10) Patent No.: US 9,256,725 B2
(45) Date of Patent: Feb. 9, 2016

(54) CREDENTIAL RECOVERY WITH THE ASSISTANCE OF TRUSTED ENTITIES

(71) Applicant: EMC Corporation, Hopkinton, MA (US)

(72) Inventors: Alina Oprea, Arlington, MA (US); Kevin D. Bowers, Melrose, MA (US); Nikolaos Triandopoulos, Arlington, MA (US); Ting-Fang Yen, Cambridge, MA (US); Ari Juels, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/190,195

(22) Filed: Feb. 26, 2014

(65) Prior Publication Data

US 2015/0242616 A1    Aug. 27, 2015

(51) Int. Cl.
*H04L 29/06* (2006.01)
*G06F 21/44* (2013.01)

(52) U.S. Cl.
CPC ...... *G06F 21/445* (2013.01); *G06F 2221/2113* (2013.01)

(58) Field of Classification Search
CPC .................................................. G06F 21/445
USPC .................................................. 726/1
See application file for complete search history.

(56) References Cited

U.S. PATENT DOCUMENTS

| | | | | |
|---|---|---|---|---|
| 8,782,403 | B1 * | 7/2014 | Satish et al. | 713/165 |
| 8,812,857 | B1 * | 8/2014 | Robison et al. | 713/176 |
| 2005/0182945 | A1 * | 8/2005 | Ali et al. | 713/182 |
| 2007/0255943 | A1 * | 11/2007 | Kern et al. | 713/155 |
| 2011/0208965 | A1 * | 8/2011 | Machani | 713/168 |
| 2011/0314279 | A1 * | 12/2011 | Ureche et al. | 713/167 |
| 2012/0239936 | A1 * | 9/2012 | Holtmanns et al. | 713/176 |
| 2012/0291108 | A1 * | 11/2012 | Talamo et al. | 726/6 |
| 2013/0013928 | A1 * | 1/2013 | Thom et al. | 713/182 |
| 2013/0061035 | A1 * | 3/2013 | Hook et al. | 713/150 |

* cited by examiner

*Primary Examiner* — Michael S McNally
(74) *Attorney, Agent, or Firm* — Krishnendu Gupta; Jason A. Reyes (57) ABSTRACT

There is disclosed a method for use in credential recovery. In one exemplary embodiment, the method comprises determining a policy that requires at least one trusted entity to verify the identity of a first entity in order to facilitate credential recovery. The method also comprises receiving at least one communication that confirms verification of the identity of the first entity by at least one trusted entity. The method further comprises permitting credential recovery based on the received verification.

19 Claims, 4 Drawing Sheets

CREDENTIAL RECOVERY WITH THE ASSISTANCE OF TRUSTED ENTITIES

FIELD OF THE INVENTION

The present invention relates generally to the field of authentication, and more specifically, to credential recovery with the assistance of trusted entities.

BACKGROUND OF THE INVENTION

In a typical conventional two-factor authentication system, a user is equipped with an authentication token. The authentication token may be implemented as a small, hand-held device that displays a series of passwords over time. These passwords, which may be one-time passwords, are more generally referred to herein as tokencodes. A user equipped with such an authentication token reads the currently displayed password and enters it into a computer or other element of an authentication system as part of an authentication operation. The user is also generally required to enter a personal identification number (PIN). Two-factor authentication is thus based on something the user has (e.g., the authentication token) and something the user knows (e.g., the PIN).

Three-factor authentication systems are also available, where the third factor required for successful authentication relates to a physical characteristic of the user, or in other words, something the user is (e.g., a fingerprint).

Authentication tokens include both time-based tokens and event-based tokens. In a typical time-based token, the displayed passwords are based on a secret value and the time of day. A verifier with access to the secret value and a time of day clock can verify that a given presented password is valid. One particular example of a time-based authentication token is the RSA SecurID user authentication token, commercially available from RSA, The Security Division of EMC Corporation, of Bedford, Mass., U.S.A. In a typical event-based token, the displayed passwords are based on a secret value and an event counter. The event counter may count the number of occurrences of a particular event, such as a user pressing a button on the token. A verifier with access to the secret value and the current event count can verify that a given presented password is valid.

Passwords can be communicated directly from an authentication token to a computer or other element of an authentication system, instead of being displayed to the user. For example, a wired connection such as a universal serial bus (USB) interface may be used for this purpose. Wireless authentication tokens are also known. In such tokens, the passwords are wirelessly communicated to a computer or other element of an authentication system. These wired or wireless arrangements save the user the trouble of reading the password from the display and manually entering it into the computer.

Additional details of exemplary conventional authentication tokens can be found in, for example, U.S. Pat. No. 4,720,860, entitled "Method and Apparatus for Positively Identifying an Individual," U.S. Pat. No. 5,168,520, entitled "Method and Apparatus for Personal Identification," and U.S. Pat. No. 5,361,062, entitled "Personal Security System," all of which are incorporated by reference herein.

A problem that can arise for users equipped with authentication tokens is that such users may want to authenticate to a given system without having possession of an operative token. For example, the user may have temporarily misplaced the token, forgotten to bring it home from the office or vice-versa, left it in the car, etc. Also, the token may break, or its battery may become depleted, etc. However, conventional authentication systems, such as the two-factor and three-factor systems noted above, generally require that the user be in physical possession of an operative token in order to authenticate.

A similar problem can arise when the user losses, misplaces or forgets another credential, such as, the something the user is meant to know. For example, the PIN discussed above.

SUMMARY OF THE INVENTION

There is disclosed a computer-implemented method, comprising: determining a policy that requires at least one trusted entity to verify the identity of a first entity in order to facilitate credential recovery; receiving at least one communication that confirms verification of the identity of the first entity by at least one trusted entity; and based on the received verification, permitting credential recovery.

There is also disclosed a non-transitory processor-readable storage medium having embodied therein one or more software programs, wherein the one or more software programs when executed by a processor implement the steps of the computer-implemented method.

There is further disclosed an apparatus, comprising: at least one processing device, said at least one processing device comprising a processor coupled to a memory; wherein the apparatus is configured to: determine a policy that requires at least one trusted entity to verify the identity of a first entity in order to facilitate credential recovery; receive at least one communication that confirms verification of the identity of the first entity by at least one trusted entity; and based on the received verification, permit credential recovery.

There is further disclosed a system, comprising: a first processing device associated with a first entity; a second processing device associated with a trusted entity; and a server configured for communication with at least one of the first and second processing devices over a network; wherein the server is configured to: determine a policy that requires at least one trusted entity to verify the identity of the first entity in order to facilitate credential recovery; receive at least one communication that confirms verification of the identity of the first entity by at least one trusted entity; and based on the received verification, permit credential recovery.

BRIEF DESCRIPTION OF THE DRAWINGS

The invention will be more clearly understood from the following description of preferred embodiments thereof, which are given by way of examples only, with reference to the accompanying drawings, in which.

DETAILED DESCRIPTION

Figure 1:
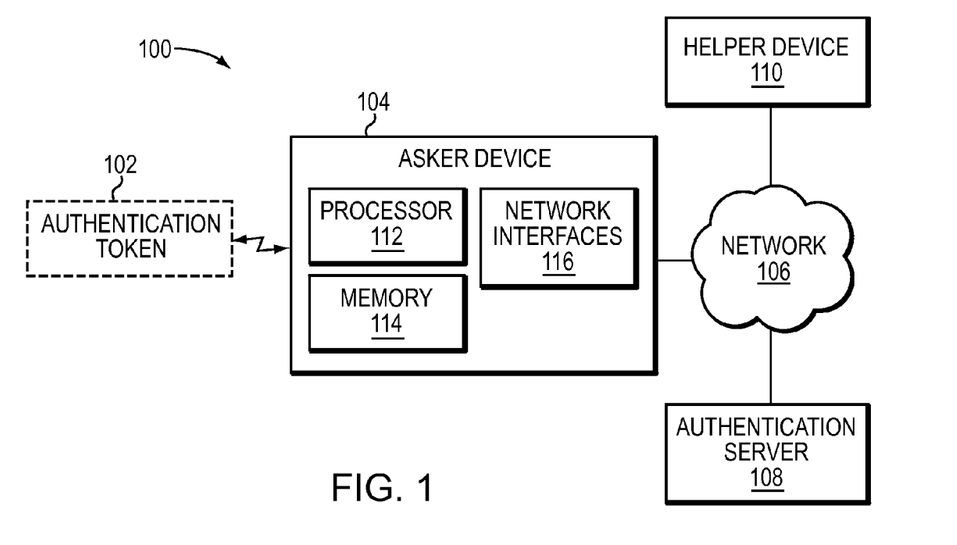
FIG. 1 is a block diagram illustrating an authentication system.

FIG. 1 shows an example of an authentication system 100 which includes an authentication token 102, an asker device

104, a network 106, an authentication server 108 and a helper device 110. The authentication token is configured to generate one-time passwords or other tokencodes in a conventional manner. Such passwords may be presented to a user via a display of the token, such that the user can manually enter a given password into a user interface of the asker device 104. Alternatively, a given password may be communicated directly from the authentication token via a wired or wireless connection between that device and the host device. By way of example, the authentication token may be configured to communicate with the asker device 104 via a wired connection such as a USB interface, or via a wireless connection such as a Bluetooth or IEEE 802.11 connection. The asker device thus serves as a host device for the authentication token.

The authentication token 102 may be a time-based authentication token, an event-based authentication token, a hybrid time-based and event-based token, or any other type of authentication token.

In the FIG. 1 embodiment, the authentication token 102 is associated with a user of the asker device 104. The token is shown in dashed outline because for this particular embodiment it is assumed that the token is temporarily not available to the user for some reason. For example, the user may have misplaced the token, or forgotten to bring it home or into the office, or the token may be broken or have a depleted battery, etc. This user is referred to as an "asker" because he or she asks another user, referred to as a "helper," to vouch for the asker. Here, in this embodiment, if the helper vouches for the asker, the helper can enable the asker to overcome the unavailable token by recovering a credential that can in turn allow the asker to authenticate to the system without being in possession of the token.

The asker device 104 as shown includes a processor 112, a memory 114 and one or more network interfaces 116. A given such network interface is utilized for communicating in a conventional manner with the network 106. The helper device 110 may be configured in a similar manner, to include processor, memory and network interface elements.

The asker device 104 and helper device 110 may each comprise, for example, a desktop, portable personal computer, mobile device, mobile telephone, smart phone, personal digital assistant (PDA), wireless email device, workstation, kiosk, television set-top box, game console, or any other information processing device that supports communication with an authentication server over a network.

The network 106 may comprise, for example, a global computer network such as the Internet, a wide area network (WAN), a local area network (LAN), a satellite network, a telephone or cable network, or various portions or combinations of these and other types of networks.

It is to be appreciated that a given embodiment of the system 100 may include multiple instances of authentication token 102, asker device 104, network 106, authentication server 108, and helper device 110, although only single instances of such components are shown in the simplified system diagram for clarity of illustration. For example, the helper or the helper device may also be equipped with an authentication token to assist in the authentication of the helper (e.g., hard token, soft token, etc.).

Figure 2:
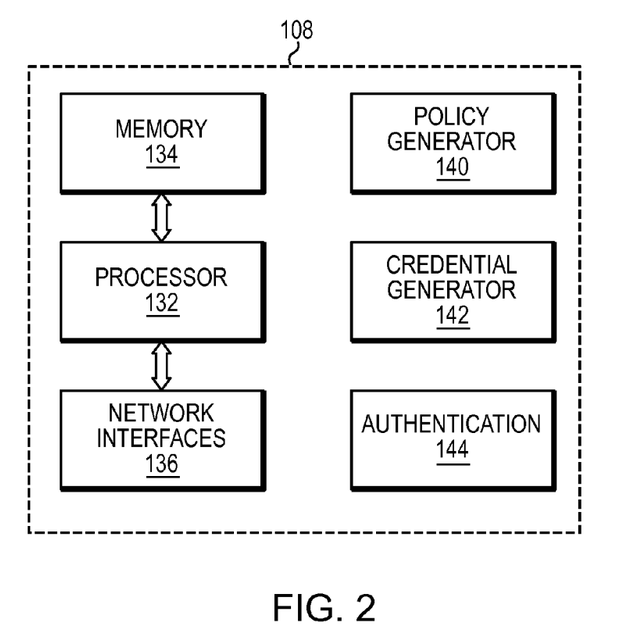
FIG. 2 is a block diagram illustrating a more detailed view of the authentication server in the authentication system of FIG. 1.

Referring now to FIG. 2, a more detailed illustrative implementation of authentication server 108 is shown. The authentication server in this embodiment comprises a processor 132 coupled to a memory 134. The processor 132 is also coupled to interface circuitry comprising one or more network interface 136.

The various elements 132, 134 and 136 of FIG. 2 may be implemented in whole or in part as a conventional microprocessor, microcontroller, digital signal processor, application-specific integrated circuit (ASIC) or other type of circuitry, as well as portions or combinations of such circuitry elements. As will be appreciated by those skilled in the art, portions of a process in accordance with an embodiment of the invention can be implemented at least in part in the form of one or more software programs that are stored at least in part in memory 134 and executed by processor 132.

A given embodiment of authentication server 108 may be implemented as a computer or other stand-alone processing platform, or may be distributed over multiple processing platforms comprising multiple separate computers. Numerous other arrangements of the authentication server are possible.

In this particular embodiment, as will be described further below, the authentication server 108 comprises a policy generator 140, a credential generator 142 and an authentication element 144 for facilitating credential recovery in the event that the authentication token (or any other credential) is unavailable. The components 140, 142 and 144 may be implemented in whole or in part utilizing software programs stored in memory 134 and executed by processor 132.

In this particular embodiment, as will be described further below, the authentication server 108 also comprises a list of recovery contacts R(U) of size $N_U$ maintained for each asker for facilitating credential recovery. For example, the list of recovery contacts may contain information in connection with entities trusted by the asker, such as, associates, social contacts, helpers, friends, family members, coworkers, etc. It should be understood that the recovery contacts may be obtained by the server, or provided to the server, or registered with the server, in a number of different ways, such as:

A list of recovery contacts may be explicitly provided by the asker

In an enterprise environment, the list of recovery contacts may be automatically populated from the organization employee chart (e.g., all coworkers from the asker's group are selected as helpers).

In a social network, friends most often contacted or family members are selected automatically as recovery contacts.

In operation, the authentication server 108 can enable the asker to recover from the unavailability of a credential (i.e., authentication token) with the assistance of trusted entities (i.e., helpers) on the recovery list. The authentication server 108 can enable credential recovery by utilizing the element 140 to dynamically determine a policy for facilitating credential recovery. For example, the authentication server 108 may determine a policy that requires an asker to get a defined number of helpers from the list of recovery contacts to vouch for the identity of the asker in order to facilitate credential recovery. The authentication server 108 can utilize the authentication element 144 to authenticate a helper that vouches for the identity of the asker. For example, the helper can verify a biometric characteristic of the asker and send the verification together with helper authentication credentials to the authentication server 108. Subsequently, the authentication server 108 confirms that the helper is on the list of recovery contacts and that the helper verified the identity of the asker. If the authentication server 108 is satisfied that the requirements of the policy have been discharged, the server can utilize element 142 to generate and provide a credential to the asker. If the server is not satisfied, the authentication server may await further verifications from helpers until the requirements are discharged. The various communications between the asker, helper and authentication server may occur over network 106, using conventional communication protocols and associated interfaces.

An illustrative embodiment of the invention will now be described in greater detail with reference to FIGS. 3 and 4. In this embodiment, it will be assumed that both the asker and the helper have authentication tokens, and that those tokens are conventional RSA SecurID user authentication tokens. It is further assumed that the asker has temporarily lost the ability to use the token, but remembers the corresponding PIN. It should be noted that these and other assumptions made herein are for illustrative purposes only, and should not be construed as requirements of the invention.

Figure 3:
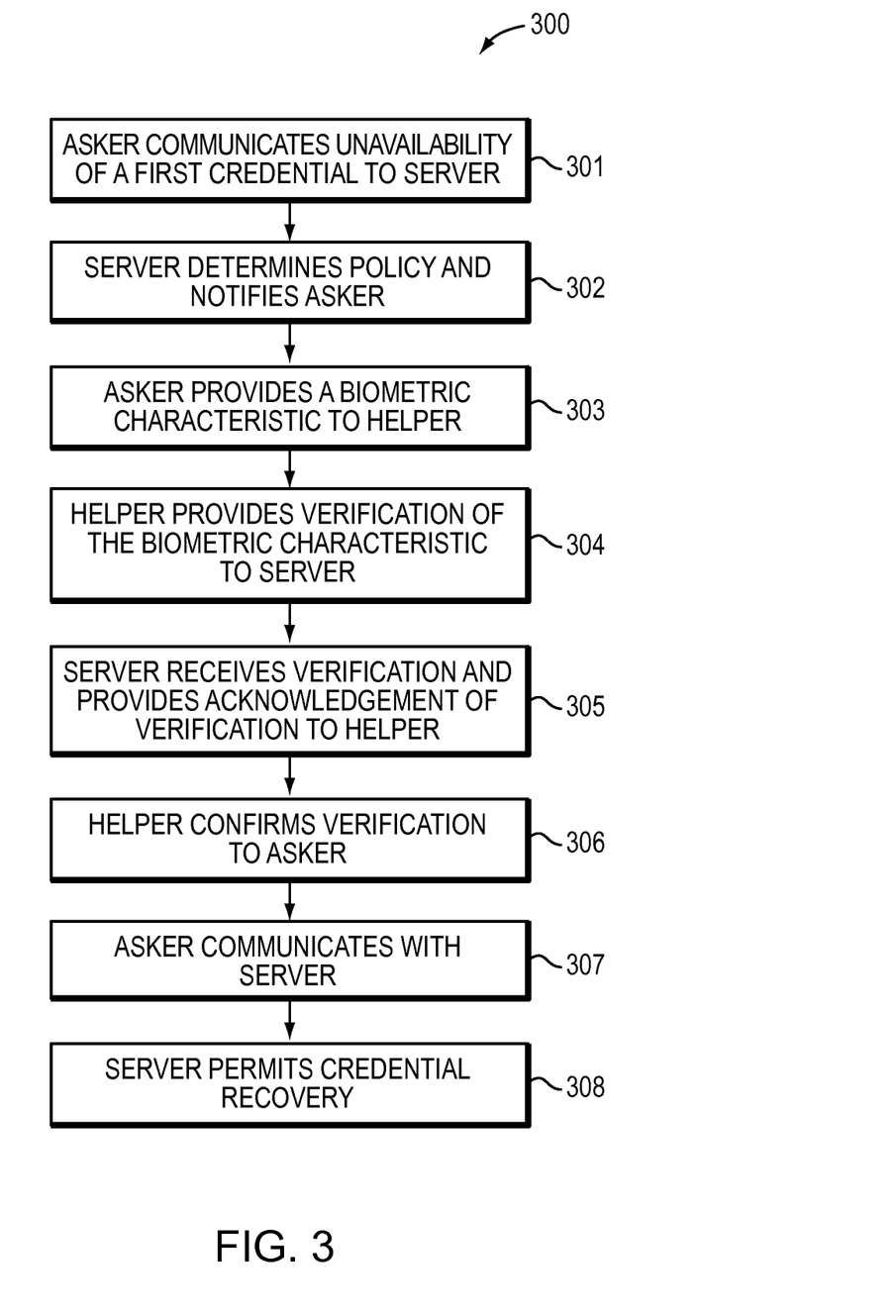
FIG. 3 is a flowchart illustrating processing steps for facilitating credential recovery.

FIG. 3 shows a flowchart of processing steps 300 for facilitating credential recovery. In the flow diagram, the processing steps are summarized in individual blocks. The processing steps may be performed in hardware, or as processor-executable instructions that may be executed by a processor. Furthermore, the processing steps may be performed in many different environments. For example, the processing steps may be performed in the environment of FIG. 1. The below description describes the performance of the processing steps in the environment of FIG. 1.

At step 301, the asker device 104 associated with the asker communicates with the authentication server 108 such that the authentication server 108 is aware that a credential is not currently available to the asker. As discussed above, in this embodiment, the unavailable credential is the authentication token that is currently unavailable to the asker. It should be appreciated that the authentication token may be required in order to access a resource such as a computerized resource.

At step 302, the authentication server 108 determines a policy that requires at least one trusted entity to verify the identity of the asker in order to facilitate credential recovery. Here, the trusted entities are those entities included on the list of recovery contacts that have a trusting relationship with the asker. The list of recovery contacts available to the authentication server 108 includes the helper. Authentication server 108 may dynamically determine one policy from a number of available policies that each requires at least one trusted entity to verify the identity of the asker.

In this particular embodiment, the authentication server 108 may dynamically determine a policy based on factors associated with the asker. For instance, the authentication server 108 may determine a policy that requires verification by three helpers in the event that the asker is in a familiar location as attested by the GPS on the asker device. Alternatively, the authentication server 108 may require verification by four helpers in the event that the asker is at a new unfamiliar location. The authentication server may notify the asker of the policy. The authentication server may also at this stage issue a temporary password to the asker with limited access rights for a predefined time interval.

In other embodiments, the authentication server 108 may determine policy based on other factors. It should be appreciated that the asker may remember answers to life questions, be able to access other accounts, be able to receive text messages, etc. The determination of the policy may be based on these additional factors. For example, the policy may require three trusted entities to vouch for the identity of the asker, but if the asker correctly answers a life question, the asker may only need two trusted entities to vouch for its identity.

It should be appreciated that there may be a variety of different types of policies. In some embodiments, the policy may require any three out of five trusted entities to verify the identity of the asker in order to facilitate credential recovery. In further embodiments, the policy may require two trusted entities out of a particular subset of trusted entities and another trusted entity from a different subset to verify the identity of the asker in order to facilitate credential recovery.

At step 303, the asker device 104 provides a biometric characteristic of the asker to the helper device 110 with a request to verify the authenticity of the biometric characteristic. In this particular embodiment, the asker device 104 may provide the biometric characteristic to several helper devices associated with different helpers. For example, the asker selects the number of helpers (or trusted entities) based on the defined number of helpers required by the policy. If three helpers are required by the policy then the asker device provides the biometric characteristic to helper devices associated with any three helpers on the list of recovery contacts. For each helper selected, the asker device (e.g., mobile device or other personal device) communicates with the respective helper devices with a view to authenticating using a channel involving biometric capabilities (e.g., face-to-face contact, video call, etc.).

At step 304, the helper device 110 provides a verification of the biometric characteristic to the authentication server 108. The helper device also provides identification of the helper to the authentication server to enable the authentication server to determine that a trusted entity has confirmed the identity of the asker. For example, a video call initiated by the asker allows the askers face to appear on the helper device with buttons superimposed thereon. The helper can click on a superimposed button on the helper device to confirm the authenticity of the asker which enables a message to be automatically transmitted by an application installed on helper device to the authentication server. The message may include the verification of the identity of the asker and the helper identification. In some other embodiments, the helper may not even be involved directly in the biometric verification. The helper device may verify without the direct involvement of the helper. For example, the asker and the helper may share a large number of photos that are stored on helper device in which asker is tagged by helper. Photo processing application on helper device performs face recognition of a received photo of asker and checks that asker is tagged correctly in the set of photos stored on the helper's device. Helper device subsequently confirms the identity of asker and communicates directly with the authentication server without the direct involvement of the helper.

At step 305, the authentication server 108 receives a communication confirming the verification of the biometric characteristic of the asker by the helper. Further, the authentication server 108 provides an acknowledgement of the verification to the helper device 110 in response to confirming the helper is a trusted entity that has verified the biometric characteristic of the asker. Here, if the authentication server 108 confirms the verification and the helper, it sends an acknowledgement confirming receipt to the helper device 110.

At step 306, the helper device 110 sends a confirmation of the verification to the asker device 104. The confirmation enables the asker to confirm that the helper has verified the authenticity of the biometric characteristic. The confirmation further assists the asker in determining whether the requirements of the policy have been discharged.

At step 307, the asker device 104 communicates with the authentication server 108 requesting credential recovery. The communication may also contain the temporary password described above.

At step 308, the authentication server 108 may permit credential recovery based on the verification. In this embodiment, the permission may also be based on the policy. For example, the authentication server may permit credential recovery by determining that verification of the identity of the asker has been received from the number of trusted entities or helpers as defined in the policy. If the number of helper verifications equals the number defined in the policy then permission is granted for credential recovery.

Authentication server 108 may permit credential recovery by providing a credential to the asker. For example, the authentication server may bind the temporary password with increased privileges to the asker. Essentially, the temporary password becomes the credential that replaces the unavailable authentication token. In other embodiments, the authentication server 108 utilizes the credential generator to generate a new credential (e.g., password) and provides same to the asker.

In another embodiment, the authentication server may permit credential recovery by providing an opportunity to the asker to generate a credential. Asker may be prompted to generate new permanent credential (e.g., password). These credential may be generated either alone by the asker or jointly by the asker and the server.

It should also be understood that the new credential may also have different access rights associated therewith. For instance:

If the asker is in a familiar location (as attested by asker device), full access rights may be granted.

If the asker is at a unfamiliar location, restricted privileges may be granted (e.g., only read access to email, but not the capability of sending emails, restrict access to internal servers storing sensitive data, etc.).

It should also be understood that if a helper does not provide a positive verification of the identity of the asker, or if a helper that is not a trusted entity verifies the asker, the authentication server may enforce different policies. For instance, asker might be required to provide evidence from a larger number of helpers. In addition, assuming that asker can provide evidence from a sufficient number of helpers, the askers future activity may be carefully monitored for potential fraud.

Additionally, it should also be understood that there may be slight variations to the steps described above without departing from the scope of the invention. For example, the server may determine the policy, and instead of the current approach of notifying asker, the server may initiate direct contact with the helpers requiring verification of a biometric characteristic of the asker that may have been provided earlier to the server.

Figure 4:
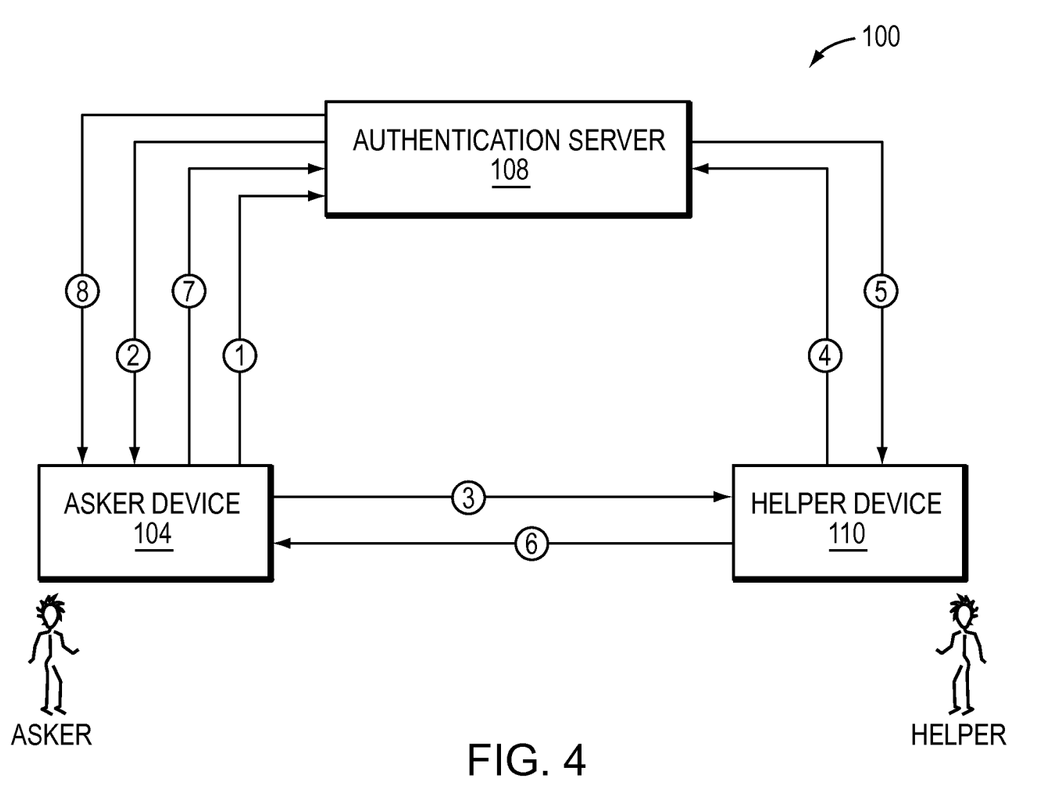
FIG. 4 is a block diagram illustrating interactions between devices in the authentication system of FIG. 1 when performing the processing steps of FIG. 3.

FIG. 4 shows interactions between various devices in the authentication system 100. The interactions as illustrated involve the eight steps as described in FIG. 3. As shown, there is only one helper illustrated in this figure. It should be appreciated though that there may be several helpers depending on the policy.

Figure 5:
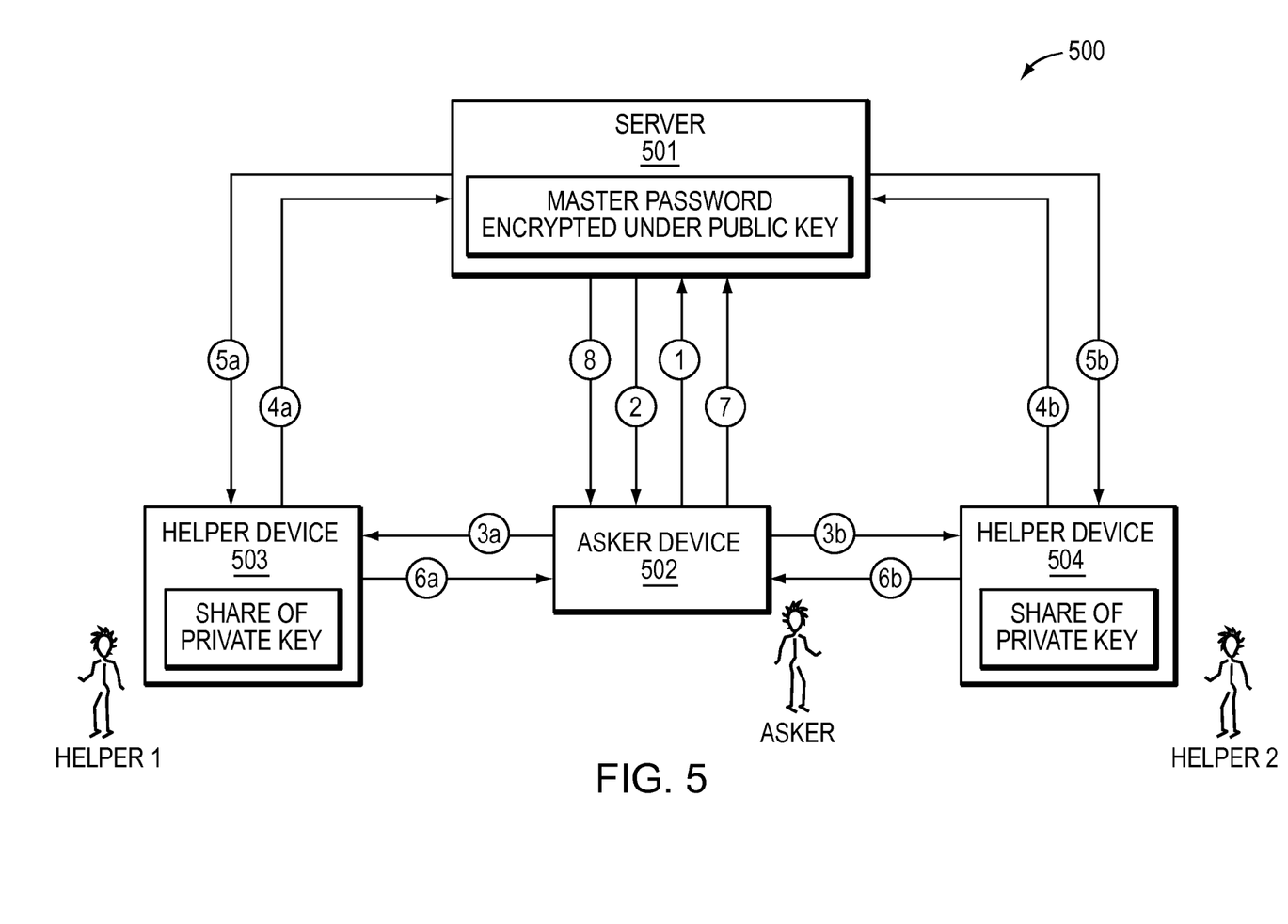
FIG. 5 is a block diagram illustrating interactions between devices in another system when performing the processing steps of FIG. 3.

FIG. 5 shows interactions between various devices in another system 500 different to the system 100. The system 500 comprises a server device 501, an asker device 502 and two helper devices (503, 504). The interactions as illustrated also involve eight steps similar to those described in FIG. 3.

In the system 500, it is assumed that a password vault, not shown in the figure, stores asker passwords that are encrypted under a master password. It is also assumed that the master password is unavailable to the asker preventing the asker from getting access to all accounts whose passwords are protected by the vault. Further, it is assumed that the server 501 escrows a master password encrypted under a public key. Additionally, it is assumed that shares of the private decryption key are distributed with helper devices (503, 504).

In this embodiment, the interactions between the various devices in the system 500 comprise the following steps:

1. Asker communicates with server to inform server that the master password is unavailable.

2. Server generates or determines a simple threshold-based policy that requires the asker to contact two helpers to vouch for the identity of the asker. It should be appreciated that the number of helpers described herein is an example only. The number of helpers may be less or more.

3. Asker selects the two helpers (503, 504) that are on the list of recovery contacts registered with the server. Asker device 502 communicates with the respective helper devices (503, 504) by making a video call to each helper. The video call has two superimposed buttons, one for attesting to the identity of asker, and one for reporting fraud.

4. During the call, helper presses one of the buttons to either vouch for asker or report fraud. The server gets immediate notification of helper's intention.

5. If the helpers verify the identity of the asker to the server, the server will on receipt of the verifications acknowledge receipt to the respective helpers.

6. Helper device subsequently sends to user device the share of the private key used for encrypting the master password through a secure channel.

7. Asker communicates with server.

8. The server authenticates the asker based on the verifications. In other words, the server authenticates the asker subject to receiving sufficient verifications that satisfy the policy. The server also permits asker access to the encrypted master password. It will be understood that the asker recovers the private decryption key by combining shares received from helpers. It then recovers the master password by decrypting the message received from the server and gets access to the vault.

It should be understood that in some embodiments the asker may be prompted by the server to change the master password and the vault re-encrypted with the new master password. The encrypted vault may be stored with the asker. The new master password is encrypted and sent to the server. Optionally, the asker can generate a new private-public key pair and may also escrow shares of the private key with the helpers.

While the above description describes various ways that the trusted entities may be registered at the server, it should also be understood that the server can monitor activity in the asker's social network given suitable permissions. If a "friend" is "unfriended," the server may revoke the friend's helper privileges. For example, in the case where shares of a user's private key are distributed among friends, the server may prompt the user's device to revoke the helper by issuing new shares, or may prompt the user to decide whether or not to perform such revocation.

While the above description describes various ways that the trusted entities may be registered at the server, it should also be understood that there may also be the possibility of leveraging helpers that are never explicitly registered. The technique described herein can also support this option by effectively performing on-the-fly registration of helpers. For example, when the asker reports an unavailable credential, the server may leverage friends in the asker's social network or recent contacts (as reported at some recent time by the asker's device) as helpers.

While the above description describes the helper verifying the identity of the asker by verifying a biometric characteristic of the asker, it should be understood that the helper can verify the identity of the asker by verifying any behavioral or personal characteristic of the asker by which the asker is recognizable. For example, the server may ask both the asker and the helper some question, the answer to which is presumed to be known by the asker and the helper, but not generally public knowledge. The question may be a simple question such as "Where did you go the last time you met for dinner?". If the asker and the helper both provide the same answer to the server then there is some assurance that the person claiming to be the asker is actually the asker that the helper knows. This could naturally be repeated for a number of questions to decrease the odds of a misidentification.

While the above description describes servers 108 and 501, it should be further understood that in some embodiments the server may be omitted. For some applications, the asker device may determine the policy and the asker may use his social network to recover his credentials without the involvement of the server. For instance, if the credential is a private key used for signing documents, asker could store shares of the private key with a set of trusted friends, and recover the private key upon unavailability.

It should again be emphasized that the above-described embodiments of the invention are presented for purposes of illustration. Many variations and other alternative embodiments may be used. For example, although described in the context of particular systems and device configurations, the techniques are applicable to a wide variety of other types of systems and associated devices. The particular process steps may be varied in alternative embodiments. Moreover, as previously mentioned, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A computer-implemented method, comprising:
   determining a policy that requires at least one trusted entity to verify the identity of a first entity in order to facilitate credential recovery, wherein the determined policy describes the number of trusted entities that are required to verify the identity of the first entity;
   receiving at least one communication that confirms verification of the identity of the first entity by at least one trusted entity; and
   based on the received verification, permitting credential recovery.

2. The method as claimed in claim 1, wherein permitting credential recovery comprises providing a credential to the first entity.

3. The method as claimed in claim 2, wherein the provided credential is one of similar, different, or a derivative of an original credential that is currently unavailable to the first entity.

4. The method as claimed in claim 2, wherein the provided credential is one of a password, a PIN, or a cryptographic key.

5. The method as claimed in claim 1, wherein permitting credential recovery comprises providing an opportunity to the first entity for facilitating generation of a credential.

6. The method as claimed in claim 1, wherein receiving at least one communication comprises receiving at least one communication from at least one trusted entity confirming verification of the identity of the first entity by the at least one trusted entity.

7. The method as claimed in claim 1, wherein receiving at least one communication comprises receiving a communication from the first entity confirming verification of the identity of the first entity by at least one trusted entity.

8. The method as claimed in claim 1, wherein receiving at least one communication comprises receiving at least one communication that confirms verification of a biometric characteristic of the first entity by at least one trusted entity.

9. The method as claimed in claim 1, further comprising:
   obtaining information in connection with at least one trusted entity that is suitable for use in confirming that at least one trusted entity verified the identity of the first entity.

10. The method as claimed in claim 9, wherein the information is obtained from one of the first entity, an employee chart, or a social network.

11. The method as claimed in claim 1, wherein determining a policy comprises dynamically determining a policy from a set of policies that requires at least one trusted entity to verify the identity of the first entity in order to facilitate credential recovery.

12. The method as claimed in claim 11, wherein the policy is determined from the set of policies based on at least one factor associated with the first entity.

13. The method as claimed in claim 11, wherein the policy is determined from the set of policies based on the current location associated with the first entity.

14. The method as claimed in claim 1, further comprising:
   in response to receiving at least one communication that confirms verification of the identity of the first entity by at least one trusted entity, determining whether the requirements of the determined policy have been satisfied; and
   in response to determining that the requirements of the determined policy have been satisfied, permitting credential recovery.

15. The method as claimed in claim 1, further comprising:
   based on at least one factor associated with the first entity, determining access rights; and
   based on permitting credential recovery, granting the access rights to first entity.

16. The method as claimed in claim 15, wherein the access rights are one of full access rights or restricted access rights.

17. A non-transitory processor-readable storage medium having embodied therein one or more software programs, wherein the one or more software programs when executed by a processor cause the processor to implement the steps of the method of:
   determining a policy that requires at least one trusted entity to verify the identity of a first entity in order to facilitate credential recovery, wherein the determined policy describes the number of trusted entities that are required to verify the identity of the first entity;
   receiving at least one communication that confirms verification of the identity of the first entity by at least one trusted entity; and
   based on the received verification, permitting credential recovery.

18. An apparatus, comprising:
   at least one processing device, said at least one processing device comprising a processor coupled to a memory;
   wherein the apparatus is configured to:
      determine a policy that requires at least one trusted entity to verify the identity of a first entity in order to facilitate credential recovery, wherein the determined policy describes the number of trusted entities that are required to verify the identity of the first entity;
      receive at least one communication that confirms verification of the identity of the first entity by at least one trusted entity; and
      based on the received verification, permit credential recovery.

19. A system, comprising:
a first processing device associated with a first entity;
a second processing device associated with a trusted entity; and
a server configured for communication with at least one of the first and second processing devices over a network;
wherein the server is configured to:
   determine a policy that requires at least one trusted entity to verify the identity of the first entity in order to facilitate credential recovery, wherein the determined policy describes the number of trusted entities that are required to verify the identity of the first entity;
   receive at least one communication that confirms verification of the identity of the first entity by at least one trusted entity; and
   based on the received verification, permit credential recovery.

* * * * *